United States Patent
Maekawa et al.

(10) Patent No.: US 9,498,912 B2
(45) Date of Patent: Nov. 22, 2016

(54) EXTRUDED RESIN FILM AND METHOD FOR PRODUCING THE SAME

(75) Inventors: Tomohiro Maekawa, Niihama (JP); Koji Koyama, Niihama (JP)

(73) Assignees: SUMITOMO CHEMICAL COMPANY, LIMITED, Tokyo (JP); ESCARBO SHEET CO., LTD., Mitsuke-Shi, Niigata (JP)

(*) Notice: Subject to any disclaimer, the term of this patent is extended or adjusted under 35 U.S.C. 154(b) by 0 days.

(21) Appl. No.: 12/323,166

(22) Filed: Nov. 25, 2008

(65) Prior Publication Data

US 2009/0136733 A1   May 28, 2009

(30) Foreign Application Priority Data

Nov. 27, 2007 (JP) .................. 2007-306215

(51) Int. Cl.
B32B 27/00 (2006.01)
B29C 47/00 (2006.01)
B29C 47/88 (2006.01)
(Continued)

(52) U.S. Cl.
CPC ....... *B29C 47/8845* (2013.01); *B29C 47/0021* (2013.01); *B29C 47/886* (2013.01); *B32B 27/08* (2013.01); *B32B 27/302* (2013.01); *B32B 27/308* (2013.01); *B32B 27/325* (2013.01); *B32B 27/365* (2013.01); *B32B 2250/00* (2013.01); *B32B 2250/24* (2013.01); *B32B 2270/00* (2013.01); *B32B 2274/00* (2013.01); *B32B 2307/40* (2013.01); *B32B 2307/734* (2013.01); *B32B 2457/00* (2013.01); *B32B 2509/00* (2013.01); *B32B 2605/00* (2013.01);
(Continued)

(58) Field of Classification Search
USPC .................................... 428/220; 264/210.2
See application file for complete search history.

(56) References Cited

U.S. PATENT DOCUMENTS

| | | | |
|---|---|---|---|
| 5,285,303 A * | 2/1994 | Okada et al. ................ | 349/117 |
| 2003/0060593 A1 * | 3/2003 | Funakoshi et al. ........... | 528/196 |
| 2006/0145374 A1 | 7/2006 | Baba et al. | |

FOREIGN PATENT DOCUMENTS

| CN | 1756643 A | 4/2006 |
|---|---|---|
| EP | 1803553 A1 * | 7/2007 |

(Continued)

OTHER PUBLICATIONS

The Notification of Reasons for Rejection (including English translation), dated Jul. 30, 2013, issued in corresponding Japanese Patent Application No. 2007-306215.

(Continued)

*Primary Examiner* — Tahseen N Khan
(74) *Attorney, Agent, or Firm* — Birch, Stewart, Kolasch & Birch, LLP

(57) ABSTRACT

An object of the present invention is to provide an extruded resin film which thermally shrinks little and a method for producing the same. The present invention provides an extruded resin film, formed by an extrusion forming method, made of a thermoplastic resin, having a thickness of from 0.03 to 0.5 mm, wherein the extruded resin film has a shrinkage ratio in the extrusion direction, S1 (%), which satisfies the following formula (1) and has a shrinkage ratio in the cross-extrusion direction, S2 (%), of from 0 to 5% when being left at rest for 0.5 hours under a hot atmosphere at the temperature of 20° C. above heat distortion temperature (Th) of the thermoplastic resin:

$$0.1/X \leq S1 \leq 1.7/X \qquad (1)$$

wherein X is thickness of the extruded resin film (mm).

10 Claims, 2 Drawing Sheets

(51) Int. Cl.
  *B32B 27/08* (2006.01)
  *B32B 27/30* (2006.01)
  *B32B 27/36* (2006.01)
  *B32B 27/32* (2006.01)

(52) U.S. Cl.
  CPC ...... *B32B 2605/003* (2013.01); *B32B 2605/08* (2013.01)

(56) References Cited

FOREIGN PATENT DOCUMENTS

| | | |
|---|---|---|
| JP | 61-162319 A | 7/1986 |
| JP | 11-235747 A | 8/1999 |
| JP | 2000-239409 A | 9/2000 |
| JP | 3194904 B2 | 6/2001 |
| JP | 2002-3620 A | 1/2002 |
| JP | 2002-301755 A | 10/2002 |
| JP | 2004-122433 A | 4/2004 |
| JP | 2006-327173 A | 12/2006 |
| JP | 2007-30410 A | 2/2007 |
| WO | WO 2007/060964 A1 | 5/2007 |

OTHER PUBLICATIONS

Notification of Reasons for Rejection for corresponding Japanese Patent Application No. 2007-306215, dated Sep. 18, 2012.
Machine translation of JP-2000-239409-A published Sep. 5, 2000.
Presentation of Publication for JP-2007-306215, dated Jun. 4, 2013 with English translation.
Presentation of Publication for JP-2007-306215, dated May 27, 2013 with English translation.
Notification of the First Office Action for corresponding Chinese Patent Application No. 200810173070.1, dated Sep. 23, 2011.
Second Office Action for corresponding Chinese Patent Application No. 200810173070.1, dated Jun. 8, 2012.
The Notice of Preliminary Rejection (including an English translation), dated Dec. 4, 2014, issued in the corresponding Korean Patent Application No. 10-2008-0118400.

* cited by examiner

EXTRUDED RESIN FILM AND METHOD FOR PRODUCING THE SAME

BACKGROUND OF THE INVENTION

1. Field of the Invention

The present invention relates to an extruded resin film of a thermoplastic resin and a method for producing the same, and particularly to an extruded resin film which exhibits little thermal shrinkage ratio and a method for producing the same.

2. Description of the Related Art

Extruded resin films made of thermoplastic resin have been used in an extremely wide variety of applications, such as interior or exterior of automobiles, exterior of household electric appliances, optical applications including liquid crystal televisions and monitors. In some of such applications, a resin film is subjected to functional coating, such as light-diffusive coating, to be provided with a new function, or a resin film is printed and then the printed film is placed in an injection molding mold to be subjected to injection molding and simultaneous lamination thereof. Therefore, situations have been increasing where a resin film is placed at a temperature equal to or higher than the heat distortion temperature of the thermoplastic resin which constitutes the film, in drying or shaping the film.

However, such an extruded resin film inherently has a large residual strain in its extrusion direction and, as a result, shrinks greatly occur in an environment equal to or higher than the heat distortion temperature. Conversely, an extruded resin film tends to expand in its cross-extruded direction and, therefore, when a film is printed and then dried, or a film is heated for shaping, warped patterns or a warped shape may be produced.

In light of such problems, there have been attempts to control the shrinkage ratio of an extruded resin film. Examples of such attempts include an art of obtaining a low-shrinking acrylic resin film by melt-extruding an acrylic resin through a T die having a slit thickness of 1 mm or less and bringing it into contact with a single metal roll (see, for example, Japanese Patent Kokai Publication No. 2002-3620), and an art of obtaining an acrylic resin sheet having a desired shrinking property by biaxial stretching (see, for example, Japanese Patent Kokai Publication No. Sho 61 (1986)-162319).

However, the film of the former art is observed to expand in the cross-extrusion direction at the heat distortion temperature or higher, which may result in great deformation of patterns printed on the film. As to the film of the latter art, it is necessary to obtain a resin film temporarily and then subject it to biaxial stretching in order to obtain a desired film. This will require a large facility and a large cost.

SUMMARY OF THE INVENTION

An objective of the present invention is to provide an extruded resin film which thermally shrinks only a little and a method for producing the same.

The present inventors investigated earnestly in order to solve the aforesaid subject. As a result, they found solving means composed of the following configurations) so that they have accomplished the present invention.

(1) An extruded resin film, formed by an extrusion forming method, made of a thermoplastic resin, having a thickness of from 0.03 to 0.5 mm, wherein the extruded resin film has a shrinkage ratio in the extrusion direction, S1 (%), which satisfies the following formula (1) and has a shrinkage ratio in the cross-extrusion direction, S2 (%), of from 0 to 5% when being left at rest for 0.5 hours under a hot atmosphere at the temperature of 20° C. above heat distortion temperature (Th) of the thermoplastic resin:

$$0.1/X \leq S1 \leq 1.7/X \tag{1}$$

wherein X is thickness of the extruded resin film (mm).

(2) The extruded resin film according to the foregoing item (1), wherein the thermoplastic resin is selected from the group consisting of methyl methacrylate-based resin, styrene-based resin, aromatic polycarbonate resin, and resins which contain an ethylenically unsaturated monomer unit with alicyclic structure.

(3) A method for producing an extruded resin film comprising:

heat-melting a thermoplastic resin and then extruding it into a sheet-form through a die; and pressure-forming the extruded molten thermoplastic resin into a film while nipping it with a highly rigid metal roll and an elastic roll having a metal thin film at its outer circumferential surface, wherein the extruded resin film is the extruded resin film according to foregoing item (1) or (2).

(4) The method for producing an extruded resin film according to the foregoing item (3), wherein the molten thermoplastic resin nipped between the rolls is shaped into a film while being pressed areally and uniformly because the elastic roll elastically deforms concavely along the outer circumferential surface of the metal roll with the molten thermoplastic resin intervening therebetween, so that the metal roll and the elastic roll are placed in areal contact with the molten thermoplastic resin under pressure.

(5) The method for producing an extruded resin film according to the foregoing item (3) or (4), wherein a contact length of the metal roll and the elastic roll is from 1 to 20 mm.

(6) The method for producing an extruded resin film according to any one of the foregoing items (3) to (5), wherein a pressing linear pressure between the metal roll and the elastic roll is from 0.1 kgf/cm to 50 kgf/cm.

(7) The method for producing an extruded resin film according to any one of the foregoing items (3) to (6), wherein the elastic roll comprises an almost solidly-cylindrical core roll, a hollowly-cylindrical metal thin film disposed so that it can cover the outer circumferential surface of the core roll, and a fluid enclosed between the core roll and the metal thin film.

(8) The method for producing an extruded resin film according to the foregoing item (7), wherein the elastic roll is configured so that the temperature thereof can be controlled through control of the temperature of the fluid.

(9) The method for producing an extruded resin film according to any one of the foregoing items (3) to (6), wherein the elastic roll comprises an almost solidly-cylindrical core roll made of an elastic material and a hollowly-cylindrical metal thin film which covers the outer circumferential surface of the core roll.

(10) The method for producing an extruded resin film according to any one of the foregoing items (3) to (9), wherein the surface temperature (Tr) of the metal roll and the elastic roll is adjusted to within a range of (Th−20° C.)≤Tr≤ (Th+20° C.) wherein Th is the heat distortion temperature of the thermoplastic resin constituting the extruded resin film.

DETAILED DESCRIPTION OF THE INVENTION

Figure 1:
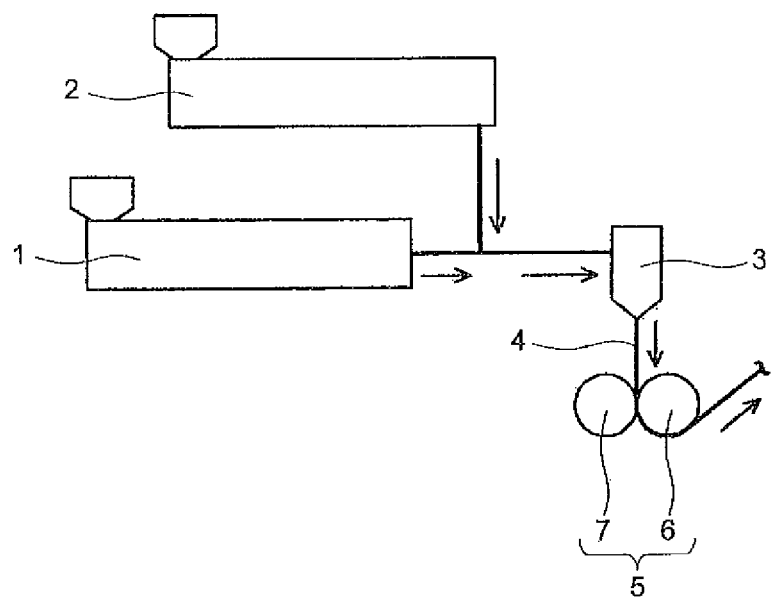
FIG. 1 is a schematic illustration showing the method for producing an extruded resin film according to one embodiment of the present invention.

The extruded resin film of the present invention is made of a thermoplastic resin. The thermoplastic resin may, without any particular limitations, be any resin which can be melt-processed, for example, general purpose plastics or engineering plastics such as polyvinyl chloride resin acrylonitrile-butadiene-styrene resin, low density polyethylene resin, high density polyethylene resin, linear low density polyethylene resin, polystyrene resin, polypropylene resin, acrylonitrile-styrene resin, cellulose acetate resin, ethylene-vinyl acetate resin, acryl-acrylonitrile-styrene resin, acryl-chlorinated polyethylene resin, ethylene-vinyl alcohol resin, fluororesin, methyl methacrylate resin, methyl methacrylate-styrene resin, polyacetal resin, polyamide resin, polyethylene terephthalate resin, aromatic polycarbonate resin, polysulfone resin, polyether sulfone resin, methylpentene resin, polyarylate resin, polybutylene terephthalate resin, resin which contains an ethylenically unsaturated monomer unit with alicyclic structure, polyphenylene sulfide resin, polyphenylene oxide resin, polyetheretherketone resin; and rubbery polymers such as polyvinyl chloride-based elastomer, chlorinated polyethylene, ethylene-ethyl acrylate resin, thermoplastic polyurethane elastomer, thermoplastic polyester elastomer, ionomer resin, styrene-butadiene block polymer, ethylene-propylene rubber, polybutadiene resin, and acrylic rubber. These may be used singly or in the form of a blend of two or more species.

Among such resins, preferred is a resin selected from the group consisting of a methyl methacrylate-based resin containing 50% by weight or more of methyl methacrylate units, which resin is of good optical properties, a resin composition comprising 100 parts by weight of the foregoing methyl methacrylate-based resin and 100 parts by weight or less of a rubbery polymer added thereto, a styrene-based resin containing 50% by weight or more of styrene units, a resin composition comprising 100 parts by weight of the foregoing styrene-based resin and 100 parts by weight or less of a rubbery polymer added thereto, an aromatic polycarbonate resin and a resin which contains an ethylenically unsaturated monomer unit with alicyclic structure.

The methyl methacrylate-based resin containing 50% by weight or more of methyl methacrylate units is a polymer which contains methyl methacrylate units as monomeric units. The content of the methyl methacrylate units is 50% by weight or more, more preferably is 70% by weight or more, and may be 100% by weight. A polymer having a methyl methacrylate unit content of 100% by weight is a methyl methacrylate homopolymer, which is obtained by polymerizing methyl methacrylate only.

Such a methyl methacrylate polymer may be a copolymer of methyl methacrylate and a monomer which can be copolymerized therewith. Examples of the monomer which can be copolymerized with methyl methacrylate include methacrylic esters other than methyl methacrylate. Examples of such methacrylic esters include ethyl methacrylate, butyl methacrylate, cyclohexyl methacrylate, phenyl methacrylate, benzyl methacrylate, 2-ethylhexyl methacrylate and 2-hydroxyethyl methacrylate. Further examples include acrylic esters such as methyl acrylate, ethyl acrylate, butyl acrylate, cyclohexyl acrylate, phenyl acrylate, benzyl acrylate, 2-ethylhexyl acrylate and 2-hydroxyethyl acrylate; unsaturated acids such as methacrylic acid and acrylic acid; halogenated styrenes such as chlorostyrene and bromostyrene; substituted styrenes, for example, alkyl styrenes such as vinyltoluene and α-methylstyrene; acrylonitrile, methacrylonitrile, maleic anhydride, phenylmaleimide and cyclohexylmaleimide. Such monomers may be used either solely or in combination.

The rubbery polymer in the present invention includes acrylic multilayer-structured polymers and graft copolymers obtained by graft polymerizing 95 to 20 parts by weight of an ethylenically unsaturated monomer, especially an acrylic unsaturated monomer, to 5 to 80 parts by weight of a rubbery polymer.

The acrylic multilayer-structured polymers include products having 20 to 60 parts by weight of a rubber elastic layer or elastomer layer enclosed and a hard layer as the outermost layer, and also may be products further having a hard layer as the innermost layer.

The rubber elastic layer or elastomer layer is a layer of an acrylic polymer having a glass transition point (Tg) of lower than 25° C. and is made of a polymer produced by crosslinking one or more monoethylenically unsaturated monomers, such as lower alkyl acrylate, lower alkyl methacrylate, lower alkoxy acrylate, cyanoethyl acrylate, acrylamide, hydroxy lower alkyl acrylate, hydroxy lower methacrylate, acrylic acid and methacrylic acid, with allyl methacrylate or the aforesaid multifunctional monomer.

A hard layer is a layer of an acrylic polymer having a Tg of 25° C. or higher and is made of a polymer composed of only an alkyl methacrylate having an alkyl group of 1 to 4 carbon atoms or a polymer comprising an alkyl methacrylate having an alkyl group of 1 to 4 carbon atoms mainly and a copolymerizable monofunctional monomer such as another alkyl methacrylate, alkyl acrylate, styrene, substituted styrene, acrylonitrile and methacrylonitrile, or may alternatively be of a crosslinked polymer resulting from polymerization with further addition of a multifunctional monomer.

For examples, polymers disclosed in Japanese Patent Kokoku Publication No. Sho 55 (1980)-27576, Japanese Patent Kokai Publication Nos. Hei 6 (1994)-80739 and Sho 49 (1974)-23292 correspond to such rubbery polymers.

Regarding the graft copolymers obtained by graft polymerizing 95 to 20 parts by weight of an ethylenically unsaturated monomer to 5 to 80 parts by weight of a rubbery polymer, diene rubbers, such as polybutadiene rubber, acrylonitrile-butadiene copolymer rubber and styrene-butadiene copolymer rubber; acrylic rubbers, such as polybutyl acrylate, polypropyl acrylate and poly-2-ethylhexyl acrylate; and ethylene-propylene-nonconjugated diene-based rubbers may be used as the rubbery polymer. Examples of the ethylenic monomers and their mixtures to be used for graft polymerizing to such rubbery polymers include styrene, acrylonitrile and alkyl (meth)acrylate. For example, products disclosed in Japanese Patent Kokai Publication No. Sho 55 (1980)-147514 and Japanese Patent Kokoku Publication No. Sho 47 (1982)-9740 can be used as such graft copolymers.

The dispersion amount of a rubbery polymer is from 0 to 100 parts by weight, and preferably is from 3 to 50 parts by weight to 100 parts by weight of a methyl methacrylate-based or styrene-based resin. A case where the amount is greater than 100 parts by weight is undesirable because the rigidity of a film will deteriorate.

The styrene-based resin containing 50% by weight or more of styrene units is a polymer which comprises styrene-based monofunctional monomer units as a major component, for example at 50% by weight or more, and may be either a homopolymer of a styrene-based monofunctional monomer or a copolymer of a styrene-based monofunctional monomer and a monofunctional monomer copolymerizable therewith.

The styrene-based monofunctional monomer is a compound that has a styrene skeleton and has, in the molecular, one radically polymerizable double bond, for example, styrene and substituted styrenes such as halogenated styrenes including chlorostyrene and bromostyrene, and alkylstyrenes including vinyltoluene and α-methylstyrene.

The monofunctional monomer copolymerizable with a styrene-based monofunctional monomer is a compound that has, in the molecule, one radically polymerizable double bond and is copolymerizable at this double bond to a styrene-based monofunctional monomer. Examples of this type of monomer include methacrylic esters such as methyl methacrylate, butyl methacrylate, cyclohexyl methacrylate, phenyl methacrylate, benzyl methacrylate, 2-ethylhexyl methacrylate and 2-hydroxyethyl methacrylate; acrylic ester, such as methyl acrylate, ethyl acrylate, butyl acrylate, cyclohexyl acrylate, phenyl acrylate, benzyl acrylate, 2-ethylhexyl acrylate and 2-hydroxyethyl acrylate; and acrylonitrile. Methacrylic esters such as methyl methacrylate are used preferably. These are used solely or in combination.

The aromatic polycarbonate resin generally includes those obtained by polymerizing a carbonate prepolymer by a solid phase transesterification method or those obtained by polymerizing a cyclic carbonate compound by a ring-opening polymerization method as well as those obtained by causing a dihydric phenol and a carbonate precursor to react together by an interfacial polycondensation method or a melt transesterification method.

Representative examples of the dihydric phenol used here include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (a common name is bisphenol A), 2,2-bis{(4-hydroxy-3-methyl)phenyl}propane, 2,2-bis{(4-hydroxy-3,5-dimethyl)phenyl}propane, 2,2-bis{(4-hydroxy-3,5-dibromo)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α"-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenylsulfoxide, 4,4'-dihydroxydiphenylsulfide, 4,4'-dihydroxydiphenyl ketone, 4,4'-dihydroxydiphenyl ether, and 4,4'-dihydroxydiphenyl ester. These may be used either solely or in the form of a mixture of two or more of them.

Particularly preferred is a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene. Especially, a homopolymer of bisphenol A and a copolymer of 1,1-bis(4-hydroxyphenyl)-3,3,5-trimethylcyclohexane with at least one dihydric phenol selected from the group consisting of bisphenol A, 2,2-bis{(4-hydroxy-3-methyl)phenyl}propane and α,α'-bis(4-hydroxyphenyl)-m-diisopropylbenzene are used preferably.

For example, a carbonyl halide, a carbonate ester or a haloformate is used as a carbonate precursor. Specific examples include phosgene, diphenyl carbonate, or a dihaloformate of a dihydric phenol.

Examples of the resin which contains an ethylenically unsaturated monomer unit with alicyclic structure include norbornene-based polymers and vinyl alicyclic hydrocarbon-based polymers. That type of resin is characterized by containing an alicyclic structure in the repeating units of the polymer. The resin may have an alicyclic structure in the main chain and/or in a side chain. From the viewpoint of light transmissibility, resins having an alicyclic structure in the main chain are preferred.

Specific examples of such polymer resins containing an alicyclic structure include norbornene-based polymers, monocyclic olefin-based polymers, cyclic conjugated diene-based polymers, vinyl alicyclic hydrocarbon-based polymers, and their hydrogenated derivatives. Among these, hydrogenated norbornene-based polymers and vinyl alicyclic hydrocarbon-based polymers or their hydrogenated derivatives are preferred from the viewpoint of light transmissibility. Hydrogenated norbornene-based polymers are more preferable.

Depending on intended purpose, a light diffusing agent, a matting agent, a UV absorber, a surfactant, an impact resisting agent, a polymer type antistatic agent, an antioxidant, a flame retarder, a lubricant, a dye, a pigment, etc. may be added to the thermoplastic resin to be used in the present invention without any problems.

The extruded resin film in the present invention is 0.03 to 0.5 mm, preferably is 0.04 to 0.3 mm, and more preferably is 0.05 to 0.2 mm in thickness. If the thickness is less than 0.03 mm, it is impossible to obtain an extruded resin film with stability by using the hereinafter described roll configuration of the present invention. If the thickness is greater than 0.5 mm, it becomes difficult to handle it as a film. The thickness of an extruded resin film can be adjusted by adjusting the thickness of a molten thermoplastic resin 4 to be extruded through a die 3 described below, the clearance between two chill rolls 5, and so on.

In the present invention, an extruded resin film is required that the shrinkage ratio S1 (%) of the extruded resin film in the extrusion direction thereof, when the extruded resin film is left at rest for 0.5 hours under an atmosphere at a temperature of 20° C. above heat distortion temperature (Th) of the thermoplastic resin, satisfies the previously provided formula (1). In other words, the shrinkage ratio S1 is from $0.1/X$ to $1.7/X$, preferably $0.2/X$ to $1.3/X$, and more preferably $0.3/X$ to $0.8/X$, where X is the thickness (mm) of the extruded resin film. If the shrinkage ratio S1 is less than $0.1/X$, a film will sag greatly when the film is heated to or above the heat distortion temperature (Th) and, as a result, cracks will appear in print or coating. If the shrinkage ratio S1 exceeds $1.7/X$, a film will shrink greatly when it is heated to or above the heat distortion temperature (Th) and the yield of products to be obtained will decrease.

Furthermore, in the present invention, it is required that the shrinkage ratio S2 (%) of the extruded resin film in the cross-extrusion direction, when the extruded resin film is left at rest for 0.5 hours under an atmosphere at a temperature of 20° C. above heat distortion temperature (Th) of the thermoplastic resin, be from 0 to 5%) preferably 1 to 4%, and more preferably 1 to 3%. If the shrinkage ratio S2 is minus, namely, less than 0%, an extruded resin film will expand, and cracks will appear in print or coating when the film is heated to the heat distortion temperature (Th) or higher. If the shrinkage ratio S2 exceeds 5%, a film will shrink greatly when it is heated to the heat distortion temperature (Th) and the yield of products to be obtained will decrease. While the heat distortion temperature (Th) of the thermoplastic resin is not particularly limited, it is usually about 60 to 200°. The heat distortion temperature (Th) of a thermoplastic resin is a temperature measured in accordance with ASTM D-648.

The shrinkage ratios S1 and S2 are values calculated as follows. First, in accordance with JIS K7133, a square of which sides have a length of 100 mm is drawn with an edge of a cutter on a specimen cut out into a size of 120 mm×120 mm square from an extruded resin film. Next, this specimen is heated by being left at rest for 0.5 hour in a hot air circulation oven the in-chamber temperature of which has been adjusted to the heat distortion temperature (Th)+20° C., and then the specimen is removed from the oven and is fully air-cooled. Thereafter, the length of each side of the aforesaid square is measured. The length of the extruded resin film in its extrusion direction is defined by the average of the two sides of the film in this direction. The length in the direction perpendicular thereto (i.e., the cross-extrusion direction) is also the average of the two sides in this direction. The shrinkage ratio S1 in the extrusion direction and the shrinkage ratio S2 in the cross-extrusion direction are calculated, respectively, by applying average lengths to the following formula (2).

$$\text{Shrinkage ratio (\%)} = \{(A-B)/A\} \times 100 \quad (2)$$

wherein A is an average of the lengths in the extrusion direction or cross-extrusion direction before heating, and B is an average of the lengths in the extrusion direction or cross-extrusion direction after heating.

Figure 2:
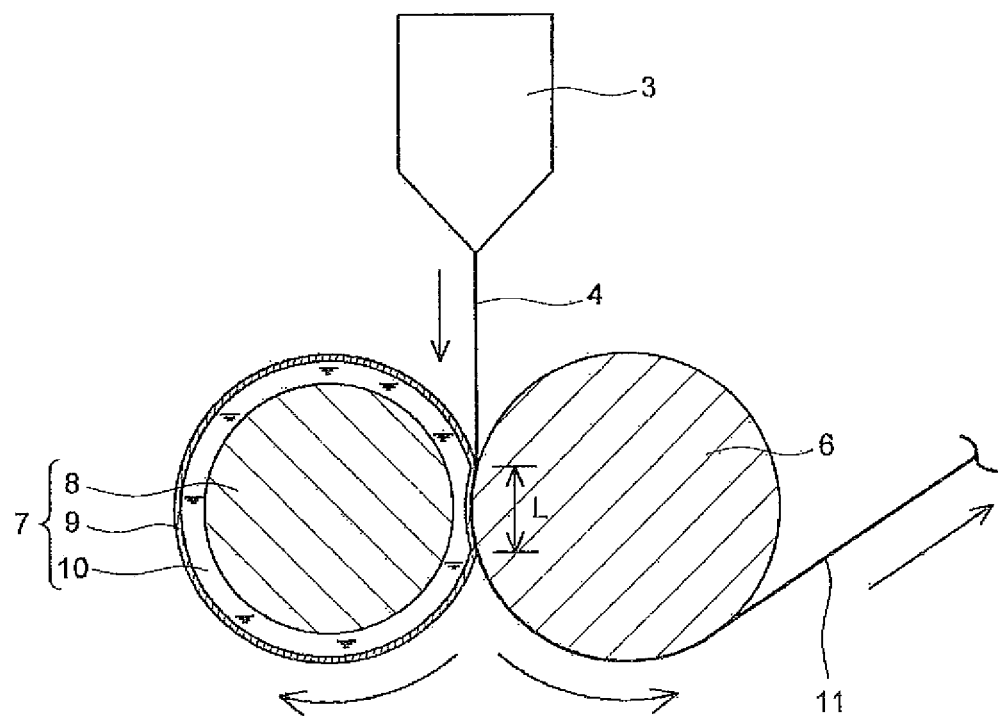
FIG. 2 is a schematic cross-sectional illustration showing a metal roll and an elastic roll according to one embodiment of the present invention.

In the present invention, in order to make the shrinkage ratios S1 and S2 in the extrusion direction and the cross-extrusion direction fall into the aforementioned ranges, it is necessary to process a molten thermoplastic resin extruded through a die into a film while nipping it with a highly rigid metal roll and an elastic roll having a metal thin film at the circumferential part thereof. Hereafter, one embodiment of the method for producing an extruded resin film according to the present invention is described in detail with reference to drawings. FIG. 1 is a schematic illustration showing the method for producing an extruded resin film according to this embodiment. FIG. 2 is a schematic cross-sectional illustration showing a metal roll and an elastic roll according to this embodiment.

The extruded resin film of this embodiment can be produced by an ordinary extrusion forming method. That is, as shown in FIG. 1, a thermoplastic resin, which is to become a substrate, is extruded through a die 3 into a sheet form while it is heated and melt-kneaded in an extruder 1 and/or an extruder 2.

When making an extruded resin film have a multilayer structure, it is possible to produce the film by a co-extrusion forming method. For example, the purpose can be attained by co-extruding a thermoplastic resin to become a substrate from the extruder 1 and another thermoplastic resin which is intended to laminate from the extruder 2. Co-extrusion can be performed by extruding and laminating the thermoplastic resins through the die 3 while heating and thereby melt-kneading the thermoplastic resins in the different extruders 1 and 2, respectively.

Examples of the extruders 1, 2 include single screw extruders and twin screw extruders. The number of the extruders is not necessarily limited to 2 and three or more extruders may be used. A T die is ordinarily used as the die 3. Besides single layer dies through which a thermoplastic resin is extruded in a single layer, multilayer dies through which two or more thermoplastic resins transferred under pressure independently from the extruders 1, 2 are laminated and co-extruded, such as feed block dies and multimanifold dies, may be employed.

When the molten thermoplastic resin 4 extruded through the die 3 as described above is cooled while being nipped with two chill rolls 5 which are oppositely arranged almost horizontally, an extruded resin film 11 is obtained. The chill rolls 5 are, as shown in FIG. 2, composed of a highly rigid metal roll 6 and an elastic roll having a metal thin film 9 at its circumferential part, namely, a metal elastic roll 7. At least one between the metal roll 6 and the metal elastic roll 7 is connected to a rotary driving device, such as a motor, and the rolls are configured so that they can rotate at specified circumferential speeds.

The highly rigid metal roll 6 is a wrapper roll around which a film-shaped thermoplastic resin after being nipped between the metal roll 6 and the metal elastic roll 7 is to be wrapped. Such a metal roll 6 is not particularly restricted, and ordinary metal rolls which have heretofore been used in extrusion forming may be employed. Specific examples include drilled rolls and spiral rolls. The surface state of the metal roll 6 may either be mirror-finished or have patterns, irregularities, etc.

The metal elastic roll 7 has a core roll 8, which is almost solidly-cylindrical and freely rotatable, and a hollowly-cylindrical metal thin film 9 which is arranged so that it can cover the circumferential surface of the core roll 8 and which will be in contact with the molten thermoplastic resin 4. A fluid 10 is enclosed in between the core roll 8 and the metal thin film 9, whereby the metal elastic roll 7 can exhibit elasticity. The core roll 8 is not particularly restricted and may be made of stainless steel, for example.

The metal thin film 9 is made of stainless steel, for example. The thickness thereof preferably is about 2 mm to about 5 mm. The metal thin film 9 preferably has flexurality, flexibility, and the like. The metal thin film preferably is of a seamless structure having no welded seam. The metal elastic roll 7 having such a metal thin film 9 has great ease of use because it excels in durability and it can be handled like ordinary mirror-finished rolls if the metal thin layer 9 is mirror finished and, if patterns or irregularities are provided to the metal thin film 9, it can serve as a roll capable of transferring the profile thereof.

The metal thin film 9 is fixed at both the ends of the core roll 8 and a fluid 10 is enclosed to between the core roll 8 and the metal thin film 9. Examples of the fluid 10 include water and oil. By controlling the temperature of the fluid 10, it is possible to make the metal elastic roll 7 temperature-controllable, whereby it is easy to control a resulting extruded resin film to have a desired shrinkage ratio and it is possible to increase the production capacity. For the temperature control, conventional controlling techniques such as PID control and ON-OFF control may be employed. Gas such as air can also be used instead of the fluid 10.

When a molten thermoplastic resin 4 is nipped between the metal roll 6 and the metal elastic roll 7, the metal elastic roll 7 deforms elastically along the outer circumferential surface of the metal roll 6 with the molten thermoplastic resin 4 intervening therebetween, and the metal elastic roll 7 and the metal roll 6 come into contact with each other over a contact length L with separation by the molten thermoplastic resin 4. The metal roll 6 and the metal elastic roll 7 are thereby placed in areal contact with the molten thermoplastic resin 4 under pressure. As a result, the molten thermoplastic resin 4 nipped between the rolls is shaped into a film while being pressed areally and uniformly. By producing a film in this fashion, it is possible to inhibit strain from remaining in a film and, as a result, the shrinkage ratios S1, S2 in the extrusion direction and the cross-extrusion direction of a resulting extruded resin film will fall within the aforementioned ranges. The contact length L used herein is the length in extrusion direction of the area where the metal roll 6 and the metal elastic roll 7 contact with the molten thermoplastic resin intervening therebetween.

The contact length L may be any value such that the shrinkage ratios S1, S2 in the extrusion direction and the cross-extrusion direction, which is perpendicular to the extrusion direction, of a resulting extruded resin film, will fall within the aforementioned ranges. Therefore, the metal elastic roll 7 is required to have elasticity as high as that the metal elastic roll 7 elastically deforms to produce the appropriate contact length L. The contact length L is 1 to 20 mm, preferably is 2 to 10 mm, and more preferably is 3 to 7 mm. The contact length L can be adjusted to a desired value by optionally adjusting the thickness of the metal thin film 9, the amount of the fluid 10 enclosed, etc.

The pressing linear pressure, which is the pressure between the metal elastic roll 7 and the metal roll 6 in contact with each other, is appropriately adjusted within a range where a proper contact length is provided. Generally, the pressing linear pressure is from 0.1 kgf/cm to 50 kgf/cm, preferably is from 0.5 kgf/cm to 30 kgf/cm, and more preferably is from 1 kgf/cm to 25 kgf/cm. When the pressing linear pressure is too low, it tends to become difficult to apply pressure areally and uniformly and tends to cause unevenness. When the pressure is too high, the resulted film tends to break, and the elastic roll tends to become short in life. The pressing linear pressure used herein is the pressure applied to a roll which is expressed as the value of pressure per 1 cm in roll width. In the case when a roll having a width of 100 cm is pressed at 300 kgf, the pressing linear pressure is 3 kgf/cm.

In shaping the molten thermoplastic resin 4 by nipping with metal roll 6 and the metal elastic roll 7, it is necessary to nip with the rolls before or during an operation of cooling the molten thermoplastic resin 4 to solidify. Specifically, it is preferable to adjust the surface temperature (Tr) of the metal roll 6 and the metal elastic roll 7 to the range of (Th−20° C.)≤Tr≤(Th+20° C.), preferably (Th−15° C.)≤Tr≤(Th+10° C.), and more preferably (Th−10° C.)≤Tr≤(Th+5° C.), base on the heat distortion temperature (Th) of the thermoplastic resin.

On the other hand, if the surface temperature (Tr) becomes a temperature lower than (Th−20° C.), the shrinkage ratio S2 tends to become low, and the film tends to have warpage. If the surface temperature (Tr) becomes a temperature higher than (Th+20° C.), the shrinkage ratio S1 tends to become high and detachment marks from the rolls tend to remain in a film, which may impair the appearance of the film.

The present invention is directed also to multilayer films in which different materials are laminated. The heat distortion temperature (Th) in such a case is on the basis of a resin highest in heat distortion temperature (Th) with respect to shrinkage ratios S1, S2, and on the basis of a resin highest in heat distortion temperature (Th) also with respect to surface temperature (Tr).

A film-shaped thermoplastic resin after being nipped between the metal roll 6 and the metal elastic roll 7 is wrapped around the metal roll 6 and then is hauled with a haul-off roll (not shown) while being cooled on a carrying roll. Thereby, an extruded resin film 11 is obtained.

Figure 3:
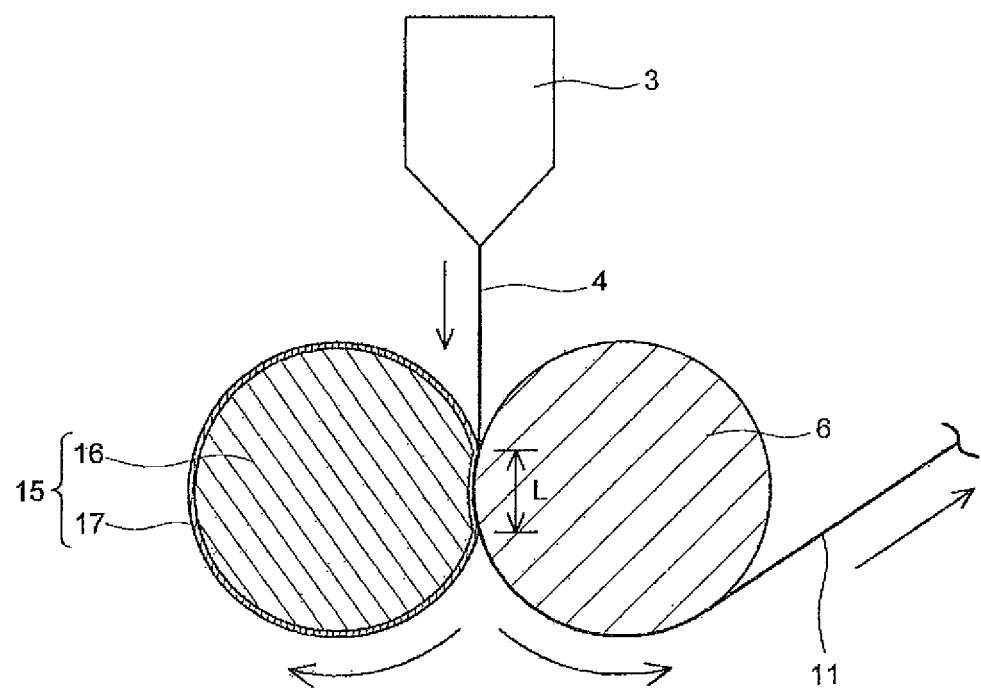
FIG. 3 is a schematic cross-sectional illustration showing an elastic roll according to another embodiment of the present invention.

Next, another embodiment of the method for producing an extruded resin film according to the present invention is described. FIG. 3 is a schematic cross-sectional illustration showing a metal roll and an elastic roll according to this embodiment. In FIG. 3, the same constituents as those in FIGS. 1 and 2 are provided with the same symbols and explanation thereof is omitted.

As shown in FIG. 3, the metal elastic roll 15 according to this embodiment is a roll in which the circumferential surface of the core roll 16, which is almost solidly-cylindrical and freely rotatable, is covered with a hollowly-cylindrical metal thin film 17.

The core roll 16 is made of an elastic material. The material which constitutes the core roll is not particularly restricted if it is an elastic material which has heretofore been used as a roll for forming films. Examples thereof include rubber rolls made of rubber such as silicone rubber. The metal elastic roll 15 can thereby exhibit elasticity. The aforesaid contact length L and pressing linear pressure can be adjusted to appropriate values also by adjusting the hardness of the rubber.

The metal thin film 17 is made of stainless steel, for example. The thickness thereof preferably is about 0.2 mm to about 1 mm.

The metal elastic roll 15 can be configured to be temperature-controllable by, for example, mounting a back-up chill roll to the metal elastic roll 15. Explanation about other specifications is omitted because they are the same as those in the embodiment previously described.

The present invention can provide an effect that even a resin film of a thermoplastic resin produced directly by extrusion forming exhibits only a small shrinkage ratio under an heating environment at a temperature equal to or higher than the heat distortion temperature of the thermoplastic resin forming the film.

Such an extruded resin film can be obtained by a simple method that a thermoplastic resin in a molten state extruded through a die is shaped into a film while being nipped with a highly rigid metal roll and an elastic roll having, at its circumferential part, a metal thin film. That is, when a molten thermoplastic resin is nipped between the metal roll and the elastic roll, the elastic roll elastically deforms along the outer circumferential surface of the metal roll with the molten thermoplastic resin intervening therebetween. The metal roll and the elastic roll are thereby placed in surface contact with the molten thermoplastic resin under pressure. Therefore, the molten thermoplastic resin nipped between the rolls is shaped into a film while being pressed in surface uniformly. When a film is produced in such a way, it is possible to inhibit strain from remaining in the film and, as a result, the resulting film will exhibit only a small shrinkage ratio under a heating environment of the heat distortion temperature or higher.

EXAMPLES

The present invention will be described in more detail below with reference to Examples, but the invention is not limited to the Examples. Configuration of the extrusion apparatus used in the following Examples and Comparative Examples is as follows:
Extruder 1: Screw diameter of 65 mm, single screw, with a vent (manufactured by Toshiba Machine Co., Ltd.);
Extruder 2: Screw diameter of 45 mm, single screw, with a vent (manufactured by Hitachi Zosen Corp.);
Feed block: 2-Kind 3-layer distribution and 2-kind 2-layer distribution (made by Hitachi Zosen Corp.);
Die 3: T die, lip width of 1400 mm, lip gap of 1 mm (manufactured by Hitachi Zosen Corp.);
Roll: Horizontal type, two chill rolls of 1400 mm in length, 300 mm in diameter.

Extruders 1, 2 and die 3 were arranged as shown in FIG. 1, and a feed block was arranged at a specified position. Then, the roll which was closest to Extruders 1, 2 was named Roll No. 1 and the wrapper roll was named Roll No. 2. The rolls were configured as follows.

<Roll Configuration 1>

The configuration shown in FIG. 3 was named Roll configuration 1. Specifically, Roll No. 1 and Roll No. 2 were configured as follows.
(Roll No. 1)

The metal elastic roll 15, in which the outer circumferential surface of the core roll 16 was covered with the metal thin film 17, was used as Roll No. 1. The core roll 16 and the metal thin film 17 are as follows.
Core roll 16: Rubber roll made of silicone rubber;
Metal thin film 17: Mirror-finished metal sleeve made of stainless steel having a thickness of 0.5 mm.
(Roll No. 2)

A mirror-finished stainless steel spiral roll was made into a highly rigid metal roll 6, which was used as Roll No. 2. The contact length L, over which the metal elastic roll 15 and the metal roll 6 were in contact with each other with separation by a molten thermoplastic resin 4, was adjusted to 5 mm and the pressing linear pressure was adjusted to 20 kgf/cm.

<Roll Configuration 2>

The configuration shown in FIG. 2 was named Roll configuration 2. Specifically, Roll No. 1 and Roll No 2 were configured as follows.
(Roll No. 1)

The metal elastic roll 7, in which the metal thin film 9 was arranged so that it could cover the outer circumferential surface of the core roll 8 and the fluid 10 was filled to between the core roll 8 and the metal thin film 9, was used as Roll No. 1. The core roll 8, the metal thin film 9, and the fluid 10 are as follows.
Core roll 8: Made of stainless steel;
Metal thin film 9: Mirror-finished metal sleeve made of stainless steel having a thickness of 2 mm;
Fluid 10: Oil. The metal elastic roll 7 was made temperature-controllable through temperature control of the oil. More specifically, the oil was made temperature-controllable through heating and cooling of the oil by ON-OFF control of a temperature controller, and the oil was circulated through between the core roll 8 and the metal thin film 9.

(Roll No. 2)

A mirror-finished stainless steel spiral roll was made into a highly rigid metal roll 6, which was used as Roll No. 2. The contact length L, over which the metal elastic roll 7 and the metal roll 6 were in contact with each other with separation by a molten thermoplastic resin 4, was adjusted to 5 mm and the pressing linear pressure was adjusted to 8 kgf/cm.

<Roll Configuration 3>

Highly rigid metal rolls (mirror-finished stainless steel spiral rolls) were used as both Roll No. 1 and Roll No. 2. In this case, the pressing linear pressure was adjusted to 100 kgf/cm.

The thermoplastic resins used in the following Examples and Comparative Examples are as follows.
Resin 1: Copolymer in which methyl methacrylate/methyl acrylate=94/6 (weight ratio). The heat distortion temperature (Th) was 100° C.
Resin 2: Mixture in which aromatic polycarbonate/styrene-methyl methacrylate (weight ratio: 95/5) copolymer=90/10. The heat distortion temperature (Th) was 110° C.
Resin 3: Polymer made of only aromatic polycarbonate (refractive index of 1.60). The heat distortion temperature (Th) was 140° C.
Resin 4: Acrylic composition in which 70% by weight of a copolymer (refractive index of 1.49) of methyl methacrylate/methyl acrylate=96/4 (weight ratio) was incorporated with 30% by weight of an acrylic multilayer elastic material obtained in the following Reference Example. The heat distortion temperature (Th) was 100° C.

Reference Example

Production of Rubbery Polymer

In accordance with the method disclosed in the Example section of Japanese Patent Kokoku Publication No. Sho 55 (1980)-27576, an acrylic multilayer elastic material of three-layer structure was produced. Specifically, 1700 g of ion exchanged water, 0.7 g of sodium carbonate and 0.3 g of sodium persulfate were charged into a glass reactor having a capacity of 5 L first, followed by stirring under nitrogen flow. Subsequently, 4.46 g of PELEX OT-P (produced by Kao Co., Ltd.), 150 g of ion exchanged water, 150 g of methyl methacrylate and 0.3 g of allyl methacrylate were charged and then heated to 75° C., followed by stirring for 150 minutes.

Then, a mixture of 689 g of butyl acrylate, 162 g of styrene and 17 of allyl methacrylate and a mixture of 0.85 g of sodium persulfate, 7.4 g of PELEX OT-P and 50 g of ion exchanged water were added through different inlet ports over 90 minutes, followed by polymerization for 90 minutes.

After the completion of the polymerization, a mixture of 326 g of methyl acrylate and 14 g of ethyl acrylate, and 30 g of ion exchanged water containing 0.34 g of sodium persulfate dissolved therein were further added through different inlet ports over 30 minutes.

When the addition was finished, the mixture was further held for 60 minutes to complete the polymerization. A resulting latex was poured into a 0.5% aqueous aluminum chloride solution, so that a polymer was condensed. The polymer was washed with hot water 5 times and then dried to yield an acrylic multilayer elastic material.

Examples 1 to 8, 14 and Comparative Examples 1 to 3, 5, 6

Preparation of Extruded Resin Film

The resin of the kind shown in Tables 1 and 2 was melt-kneaded in Extruder 1, and then was fed to the feed block and to the die 3, successively. Then, the molten thermoplastic resin 4 extruded through the die 3 was processed into a film while being nipped between Roll No. 1 and Roll No. 2 of the roll configuration shown in Tables 1 and 2. Thus, an extruded resin film having the thickness shown in Tables 1 and 2 was obtained. It is noted that 'surface temperature of Roll No. 1' and 'surface temperature of Roll No. 2' given in Tables 1 and 2 are values actually measured.

Examples 9, 10, 12, 13, 15 and Comparative Example 4, 7, 8

As resin layer A, the resin of the kind shown in Tables 1 and 2 was melt-kneaded in Extruder 1, and then fed to the feed block. On the other hand, as resin layer B, the resin of the kind shown in Tables 1 and 2 was melt-kneaded in Extruder 2, and then fed to the feed block. Co-extrusion forming was performed so that the resin layer A fed to the feed block from Extruder 1 would form a main layer and the resin layer B fed to the feed block from Extruder 2 would form a surface layer (one side/upper side).

Then, the molten thermoplastic resin 4 extruded through the die 3 was processed into a film while being nipped between Roll No. 1 and Roll No. 2 of the roll configuration shown in Tables 1 and 2. Thus, an extruded resin film of bilayer structure having the thickness shown in Tables 1 and 2 was obtained. The 'thickness' in the column of Extruder 1 kind shown in Table 2 was melt-kneaded in Extruder 1, and then fed to the feed block. Co-extrusion forming was performed so that the resin layer A fed to the feed block from Extruder 1 would form an intermediate layer and the resin layer B fed to the feed block from Extruder 2 would form both surface layers.

Then, the molten thermoplastic resin 4 extruded through the die 3 was processed into a film while being nipped between Roll No. 1 and Roll No. 2 of the roll configuration shown in Table 1. Thus, an extruded resin film of trilayer structure having the thickness shown in Tables 1 and 2 was obtained.

<Evaluation>

For each of the obtained extruded resin films (Example 1 to 15 and Comparative Examples 1 to 8), the shrinkage ratios S1 and S2 in the extrusion direction and the cross-extrusion direction, respectively, were calculated in accordance with the method described above. The results are set forth in Tables 1 and 2. The 'oven temperature' in the 'shrinkage ratio' column in Tables 1 and 2 indicates the in-chamber temperature of the hot air circulation oven used for heating specimens (that is, heat distortion temperature (Th)+20° C.). In each of Examples 9 to 13, 15 and Comparative Example 4, 7, 8, the resin highest in heat distortion temperature (Th) was used as a standard. In the columns of the shrinkage ratios S1 and S2 in Tables 1 and 2, results with + indicates that the specimen shrunk, and results with − indicates that the specimen swelled.

TABLE 1

| | Extruder 1 | | | Extruder 2 | | | | | Surface | Surface | Shrinkage ratio | | |
|---|---|---|---|---|---|---|---|---|---|---|---|---|---|
| | Resin layer A Kind | Th °C. | Thickness mm | Resin layer B Kind | Th °C. | Thickness mm | Total thickness mm | Roll configuration Kind | temp. of Roll No. 1 °C. | temp. of Roll No. 2 °C. | Oven temp. °C. | S1 % | S2 % |
| Example 1 | 1 | 100 | 0.13 | — | — | — | 0.13 | 2 | 95 | 97 | 120 | 5.5 | 1.5 |
| Example 2 | 1 | 100 | 0.3 | — | — | — | 0.3 | 2 | 95 | 103 | 120 | 3.8 | 2.0 |
| Example 3 | 1 | 100 | 0.5 | — | — | — | 0.5 | 2 | 95 | 103 | 120 | 3.1 | 1.5 |
| Example 4 | 4 | 100 | 0.05 | — | — | — | 0.05 | 2 | 95 | 103 | 120 | 10.8 | 1.9 |
| Example 5 | 4 | 100 | 0.1 | — | — | — | 0.1 | 1 | 82 | 82 | 120 | 6.1 | 2.4 |
| Example 6 | 4 | 100 | 0.4 | — | — | — | 0.4 | 1 | 83 | 82 | 120 | 3.0 | 1.6 |
| Example 7 | 3 | 140 | 0.06 | — | — | — | 0.06 | 2 | 130 | 138 | 160 | 3.4 | 0.9 |
| Example 8 | 3 | 140 | 0.2 | — | — | — | 0.2 | 2 | 130 | 138 | 160 | 2.1 | 1.0 |
| Example 9 | 3 | 140 | 0.23 | 1 | 100 | 0.07 | 0.3 | 2 | 120 | 135 | 160 | 3.3 | 1.2 |
| Example 10 | 3 | 140 | 0.43 | 1 | 100 | 0.07 | 0.5 | 2 | 123 | 138 | 160 | 2.4 | 1.4 |
| Example 11 | 3 | 140 | 0.06 | 4 | 100 | 0.01/0.01 | 0.08 | 2 | 122 | 125 | 160 | 11.7 | 2.2 |
| Example 12 | 4 | 100 | 0.11 | 2 | 110 | 0.02 | 0.13 | 1 | 97 | 97 | 130 | 6.4 | 2.0 |
| Example 13 | 4 | 100 | 0.06 | 2 | 110 | 0.02 | 0.08 | 2 | 85 | 97 | 130 | 12.4 | 2.1 |
| Comparative Example 1 | 1 | 100 | 0.5 | — | — | — | 0.5 | 3 | 95 | 103 | 120 | 18.2 | −6.2 |
| Comparative Example 2 | 4 | 100 | 0.13 | — | — | — | 0.13 | 3 | 95 | 97 | 120 | 22.4 | −7.3 |
| Comparative Example 3 | 3 | 140 | 0.13 | — | — | — | 0.13 | 3 | 130 | 138 | 160 | 11.7 | −3.5 |
| Comparative Example 4 | 3 | 140 | 0.43 | 1 | 100 | 0.07 | 0.5 | 3 | 123 | 138 | 160 | 8.7 | −4.6 |
| Comparative Example 5 | 4 | 100 | 0.2 | — | — | — | 0.2 | 2 | 123 | 121 | 120 | 9.0 | 2.3 | and that of in the column of Extruder 2 in Tables 1 and 2 indicate the thickness of the resin layer A and that of the resin layer B, respectively. Moreover, 'total thickness' in Tables 1 and 2 indicates the total thickness of an extruded resin film obtained.

Example 11

As resin layer A, the resin of the kind shown in Table 1 was melt-kneaded in Extruder 1, and then fed to the feed block. On the other hand, as resin layer B, the resin of the As shown in Table 1, the extruded films of Examples 1 to 13 according to the present invention had the shrinkage ratio in the extrusion direction, S1, which satisfied the aforementioned formula (1) and the shrinkage ratio in the cross-extrusion direction, S2, within the range of 0 to 5%, so that the shrinkage ratios were small.

On the other hand, in the extruded resin films of Comparative Examples 1, 2 and 4, both the shrinkage ratios S1 and S2 were outside the ranges of the present invention, and in the extruded resin film of Comparative Example 3, the shrinkage ratio S2 was outside the range of the present invention. The following assumption is made with the extruded resin films of Comparative Examples 1 to 4. Since roll configuration 3 was used, in other words, a molten thermoplastic resin was processed into a film while being nipped between two metal rolls, the rolls were not able to come into contact with the molten thermoplastic resin in surface and, therefore, the molten thermoplastic resin was shaped into a film without being pressed uniformly. As a result, a large strain remained in the film to produce a large shrinkage ratio.

The extruded resin film of Comparative Example 5 had a shrinkage ratio S1 which was beyond the range of the present invention. As to this extruded resin film, both the surface temperatures of the roll No. 1 and the roll No. 2 were higher than (Th+20° C.) based on the heat distortion temperature (Th) of the thermoplastic resin. This provides an assumption that since, even though roll configuration 2 was used, the resin was stretched while it was still soft before being fully cooled on a roll section, a strain remained in the film to produce a large shrinkage ratio.

TABLE 2

| | Extruder 1 | | | Extruder 2 | | | | Surface | Surface | Shrinkage ratio | | | |
|---|---|---|---|---|---|---|---|---|---|---|---|---|---|
| | Resin layer A Kind | Th ° C. | Thickness mm | Resin layer B Kind | Th ° C. | Thickness mm | Total thickness mm | Roll configuration Kind | temp. of Roll No. 1 ° C. | temp. of Roll No. 2 ° C. | Oven temp. ° C. | S1 % | S2 % | Film appearance |
| Example 14 | 1 | 100 | 0.3 | | | | 0.3 | 2 | 112 | 115 | 120 | 4 | 1.9 | Good |
| Comparative Example 6 | 1 | 100 | 0.3 | | | | 0.3 | 2 | 72 | 73 | 120 | 5.2 | 1.6 | Large warpage |
| Example 15 | 2 | 140 | 0.23 | 3 | 100 | 0.07 | 0.3 | 2 | 154 | 138 | 160 | 3.5 | 1.4 | Good |
| Comparative Example 7 | 2 | 140 | 0.23 | 3 | 100 | 0.07 | 0.3 | 2 | 168 | 162 | 160 | 3.9 | 1.4 | Strong detachment line |
| Comparative Example 8 | 2 | 140 | 0.23 | 3 | 100 | 0.07 | 0.3 | 2 | 114 | 117 | 160 | 2.9 | 1.2 | Large warpage |

As shown in Table 2, the extruded films of Examples 14 and 15 according to the present invention had the shrinkage ratio in the extrusion direction, S1, which satisfied the aforementioned formula (1) and the shrinkage ratio in the cross-extrusion direction, S2, within the range of 0 to 5%, so that the shrinkage ratios were small. They did not show warpage nor surface imperfection, and were good in appearance.

On the other hand, the extruded resin films of Comparative Examples 6, 7 and 8 were poor in appearance. In Comparative Examples 6 and 8, too law forming temperature caused warpage in the extruded film. In Comparative Example 7, too high forming temperature caused detachment marks on the film surface.

What is claimed is:

1. An extruded resin film, formed by an extrusion forming method, comprising at least one thermoplastic resin, the extruded resin film having a thickness of from 0.03 to 0.5 mm and a shrinkage ratio in the extrusion direction, S1 (%), which satisfies the following formula (1) and has a shrinkage ratio in the cross-extrusion direction, S2 (%), of from 0 to 5% when being left at rest for 0.5 hours under a hot atmosphere at the temperature of 20° C. above heat distortion temperature (Th) of the highest heat distortion temperature thermoplastic resin included in the extruded resin film:

$$0.1/X \leq S \leq 1.7/X \quad (1),$$

wherein X is thickness of the extruded resin film (mm), and wherein the extruded resin film is consisting of a single layer film of aromatic polycarbonate resin, or a laminated film of an aromatic polycarbonate resin layer and a methyl methacrylate-based resin layer.

2. The extruded resin film according to claim 1, wherein the methyl methacrylate-based resin layer comprises a rubbery polymer.

3. A method for producing an extruded resin film comprising:
heat-melting a thermoplastic resin and then extruding it into a sheet-form through a die; and
pressure-forming the extruded molten thermoplastic resin into a film while nipping it with a highly rigid metal roll and an elastic roll having a metal thin film at its outer circumferential surface, wherein the extruded resin film is the extruded resin film according to claim 1.

4. The method for producing an extruded resin film according to claim 3, wherein the molten thermoplastic resin nipped between the rolls is shaped into a film while being pressed areally and uniformly because the elastic roll elastically deforms concavely along the outer circumferential surface of the metal roll with the molten thermoplastic resin intervening therebetween, so that the metal roll and the elastic roll are placed in areal contact with the molten thermoplastic resin under pressure.

5. The method for producing an extruded resin film according to claim 3, wherein a contact length of the metal roll and the elastic roll is from 1 to 20 mm.

6. The method for producing an extruded resin film according to claim 3, wherein a pressing linear pressure between the metal roll and the elastic roll is from 0.1 kgf/cm to 50 kgf/cm.

7. The method for producing an extruded resin film according to claim 3, wherein the elastic roll comprises an almost solidly-cylindrical core roll made of an elastic material and a hollowly-cylindrical metal thin film which covers the outer circumferential surface of the core roll.

8. The method for producing an extruded resin film according to claim 3, wherein the surface temperature (Tr) of the metal roll and the elastic roll is adjusted to within a range of (Th−20° C.)≤Tr≤(Th+20° C.) wherein Th is heat distortion temperature of the thermoplastic resin constituting the extruded resin film.

9. The method for producing an extruded resin film according to claim 3, wherein the elastic roll comprises an almost solidly-cylindrical core roll, a hollowly-cylindrical metal thin film disposed so that it covers the outer circumferential surface of the core roll, and a fluid enclosed between the core roll and the metal thin film.

10. The method for producing an extruded resin film according to claim 9, wherein the elastic roll is configured so that the temperature thereof can be controlled through control of the temperature of the fluid.

* * * * *